United States Patent
Poirier et al.

(10) Patent No.: US 8,718,921 B2
(45) Date of Patent: May 6, 2014

(54) METHOD AND SYSTEM FOR AVOIDING AN INTERCEPTING VEHICLE BY AN AIRBORNE MOVING BODY

(75) Inventors: Serge Poirier, Issy-les-Moulineaux (FR); Frédéric Michaud, Paris (FR)

(73) Assignee: MBDA France, Paris (FR)

( * ) Notice: Subject to any disclaimer, the term of this patent is extended or adjusted under 35 U.S.C. 154(b) by 213 days.

(21) Appl. No.: 13/394,526

(22) PCT Filed: Sep. 13, 2010

(86) PCT No.: PCT/FR2010/000619
§ 371 (c)(1),
(2), (4) Date: Mar. 6, 2012

(87) PCT Pub. No.: WO2011/033190
PCT Pub. Date: Mar. 24, 2011

(65) Prior Publication Data
US 2012/0166073 A1    Jun. 28, 2012

(30) Foreign Application Priority Data
Sep. 17, 2009  (FR) ..................... 09 04441

(51) Int. Cl.
*G08G 5/04* (2006.01)
*G01S 13/00* (2006.01)

(52) U.S. Cl.
USPC .............................. 701/301; 701/3; 342/25 B

(58) Field of Classification Search
None
See application file for complete search history.

(56) References Cited

U.S. PATENT DOCUMENTS

| 5,552,788 A | 9/1996 | Ryan et al. |
| 6,147,638 A | 11/2000 | Rohling et al. |
| 7,295,154 B2 * | 11/2007 | Walton et al. ................. 342/194 |
| 7,307,579 B2 * | 12/2007 | Rees et al. ...................... 342/29 |
| 2006/0012511 A1 | 1/2006 | Dooi et al. |
| 2006/0170587 A1 * | 8/2006 | Kai ................. 342/70 |
| 2008/0055149 A1 * | 3/2008 | Rees et al. ...................... 342/29 |
| 2008/0100493 A1 | 5/2008 | Akita et al. |
| 2009/0040097 A1 | 2/2009 | Sakamoto et al. |

FOREIGN PATENT DOCUMENTS

DE          3637165 A1 *  5/1988
WO   WO 2008/134815 A1   11/2008

OTHER PUBLICATIONS

International Search Report completed Jan. 31, 2011 and mailed Feb. 7, 2011 from corresponding International Application No. PCT/FR2010/000619 filed Sep. 13, 2010 (3 pages).
Written Opinion completed Jan. 31, 2011 and mailed Feb. 7, 2011 from corresponding International Application No. PCT/FR2010/000619 filed Sep. 13, 2010 (16 pages).
Rohling et al., "Radar Waveform for Automotive Radar Systems and Applications", Radar Conference, 2008. Radar '08. IEEE, IEEE, Piscataway, NJ, USA, May 26, 2008, pp. 1-4. XP031376469ISBN: 978-1-4244-1538-0 (4 pages).

* cited by examiner

*Primary Examiner* — James Trammell
*Assistant Examiner* — Demetra Smith-Stewart
(74) *Attorney, Agent, or Firm* — Klein, O'Neill & Singh, LLP

(57) ABSTRACT

The present disclosure relates to an avoidance system which comprises means for determining, from at least the value of a parameter for the movement (R, Vr) of an intercepting vehicle relative to said moving body and from the incoming direction (θo, φo) of said vehicle relative to said moving body, an order of avoidance intended for said automatic means of piloting said moving body in such a way that the latter automatically carries out a maneuver for avoiding said vehicle.

20 Claims, 5 Drawing Sheets

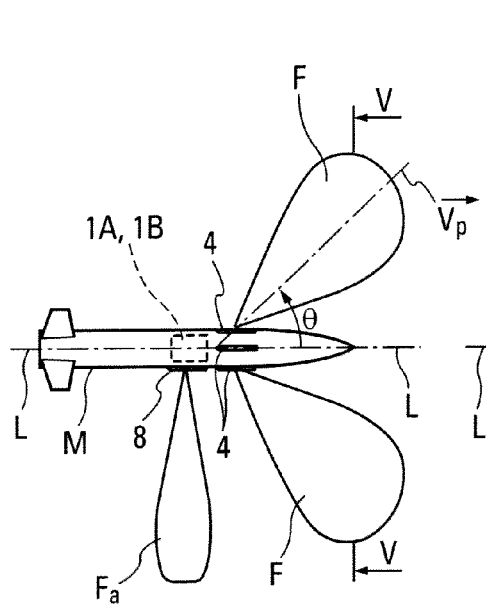 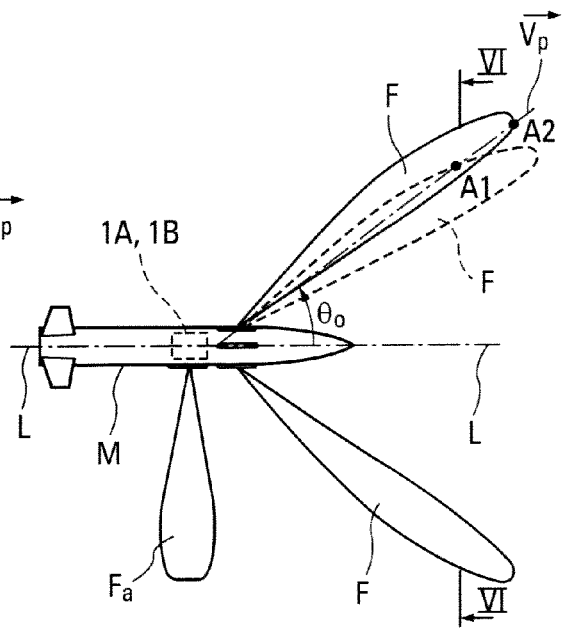
Fig. 3  Fig. 4
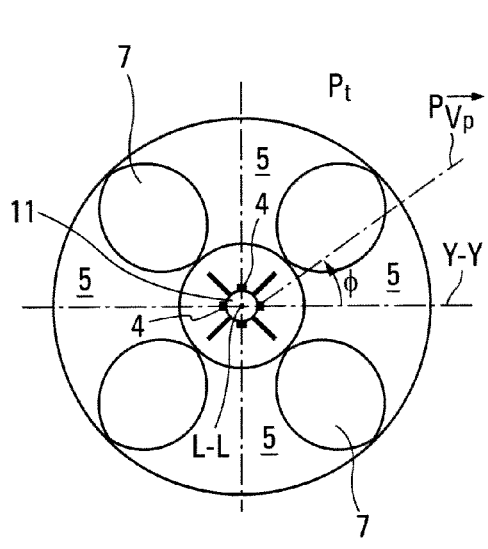 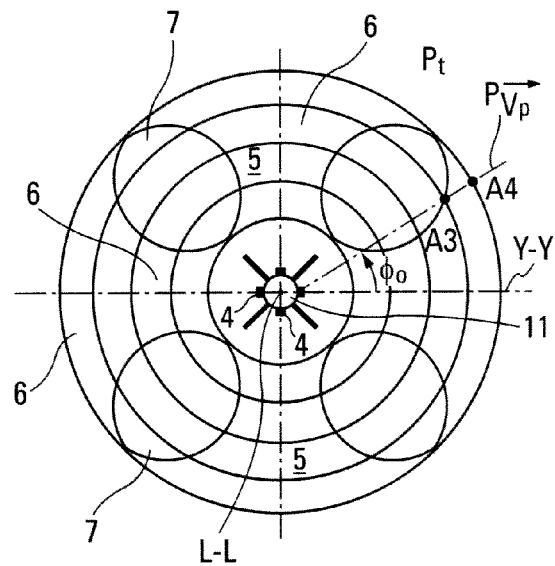
Fig. 5  Fig. 6

METHOD AND SYSTEM FOR AVOIDING AN INTERCEPTING VEHICLE BY AN AIRBORNE MOVING BODY

CROSS-REFERENCE TO RELATED APPLICATIONS

This is a national phase application under 35 U.S.C. §371 of PCT Application No. PCT/FR2010/000619 filed Sep. 13, 2010, which claims the benefit of French application No 0904441 filed Sep. 17, 2009, the contents of each of which are expressly incorporated herein by reference.

FIELD OF ART

The present disclosure relates to a method and a system for avoiding an intercepting vehicle by an airborne moving body, as well as an airborne moving body provided with such an avoidance system.

The present method, system and device are more particularly well adapted, although not exclusively, for an autonomous airborne moving body, for example of the missile type.

BACKGROUND

It is known that there are numerous defense means, including of the missile, anti-missile type, being intended for intercepting and destroying airborne moving bodies during their flight, before the latter have been able to carry out their mission.

SUMMARY

The present method, system and device aim at allowing an airborne moving body to avoid an attacking flying vehicle threatening to destroy it.

To this end, it relates to a method for avoiding a flying intercepting vehicle by an airborne moving body, said airborne moving body comprising automatic piloting means as well as emitting and receiving antennas for electromagnetic signals, wherein the following steps are automatically carried out:

by means of at least one of said antennas, at least one electromagnetic signal is emitted ahead of said airborne moving body, the frequency of which is temporally modulated;

through at least one of said antennas, at least one reflected electromagnetic signal is received, corresponding to the reflection of said electromagnetic signal emitted on said flying vehicle; and the incoming direction of said vehicle is evaluated with respect to said airborne moving body, which is remarkable:

in that said emitted electromagnetic signal is a sinusoidal signal being cut in pulses, the frequency of which varies linearly as a function of the time according to a predetermined modulation law, so that said reflected electromagnetic signal is also a sinusoidal signal being cut in pulses, the frequency of which varies according to the same predetermined modulation law; and in that the following steps are further automatically carried out:

from said emitted and reflected electromagnetic signals, at least one analysis signal is formed, the frequency of which corresponds to the frequency deviation between the frequencies of said emitted and reflected signals;

a spectrum analysis of said analysis signal is carried out for determining at least one value of said frequency deviation and for eliminating the ground echo;

from said determined value of said frequency deviation being determined, the value is calculated of at least one evolution parameter for said intercepting vehicle relative to said airborne moving body; and from at least the determined value of said evolution parameter and the incoming direction, an order of avoidance is determined being intended for said automatic piloting means, in such a way that said airborne moving body automatically carries out a maneuver for avoiding said vehicle.

Thus, thanks to the present method, system and device, since detecting a flying vehicle implements electromagnetic waves having this advantage of being not very sensitive to meteorological conditions, the airborne moving body can, automatically, trigger a maneuver for avoiding such a flying vehicle, so as to make an interception by the latter fail. In addition, cutting in pulses allows emission periods to be alternated with silent periods during which it is possible to analyze the reflected signal without being disturbed by the emitted signal.

It is further to be noticed that the prior document WO 2008/134815, describing a method allowing a drone to prevent any collision with a vehicle through an automatic correction of the trajectory of the latter, is clearly distinct from the previously described method of the present method, system and device.

Indeed, even if it discloses steps of emission ahead of an electromagnetic signal the frequency of which is temporally modulated, of reception of the electromagnetic signal as reflected by the vehicle, of evaluation of the incoming direction of the vehicle relative to the airplane and of determination of an order of avoidance of the vehicle from, more specifically, the incoming direction, it can be observed that this document WO2008/134815 does not provide at all forming an analysis signal the frequency of which corresponds to the frequency deviation between the frequencies of emitted and reflected signals. In addition, it is not able to implement any spectrum analysis of the analysis signal, as the latter is not formed. Moreover, this document does not disclose any calculation step, from the frequency deviation as determined by a spectrum analysis, of an evolution parameter (separation distance, radial speed) for a vehicle relative to the airplane.

Otherwise stated, document WO 2008/134815 cannot dispute the patentability of the present method, system and device.

On the other hand, according to the present method, system and device, preliminarily to forming the analysis signal, advantageously each of said emitted and reflected signals is transformed into a continuous sinusoidal signal, the frequency of which linearly varies as a function of the time according to said modulation law.

Preferably:

according to said predetermined modulation law, the frequency varies as a function of time according to a predefined modulation slope, during a first time interval of emission, and according to the opposite of said modulation slope, during a second time interval of emission; and said frequency deviation between frequencies of said emitted and reflected signals varies in the course of time and is defined by the following relationships:

$$\Delta f1 = \frac{2aR}{c} + \frac{2Vr}{\lambda}$$

on at least one part of said first time interval; and $$\Delta f2 = -\frac{2aR}{c} + \frac{2Vr}{\lambda}$$

on at least one part of said second time interval;
wherein:
a represents said modulation slope:
R corresponds to the distance separating said moving body from said vehicle;
c is equal to the speed of light;
Vr represents the relative radial speed of said vehicle with respect to said moving body; and
λ corresponds to the wavelength of said emitted signal.

Advantageously, said spectrum analysis is a fast digital Fourier transform analysis.

Preferably, for evaluating the incoming direction of said vehicle relative to said airborne moving body, the direction of the Poynting vector associated with said reflected signal is determined by estimating a first angle, defined between the direction of said Poynting vector and the longitudinal axis of said airborne moving body, and a second angle, defined between the projection of said Poynting vector on a plane being orthogonal to the longitudinal axis of said airborne moving body, crossing one of said antennas, and a reference axis belonging to said orthogonal plane.

In addition, in a particular embodiment of the present method, system and device:
said airborne moving body comprises four emission and reception antennas; and
said antennas are regularly distributed around one single same transversal section of said airborne moving body.

Preferably, said airborne moving body being provided with at least one altimetry antenna for measuring the height of said moving body above the ground, one of the following steps is exclusively carried out:
an order of avoidance is determined intended for said automatic piloting means; and
the height of said moving body above the ground is measured by means of said altimetry antenna.

The present disclosure also relates to a system for avoiding a flying intercepting vehicle by an airborne moving body, said airborne moving body comprising automatic piloting means and emission and reception antennas for electromagnetic signals. According to the present disclosure, said system, embedded on board said airborne moving body, comprising:
said antennas able to emit, ahead of said moving body, an electromagnetic signal the frequency of which is temporally modulated and to receive a reflected electromagnetic signal corresponding to the reflection of said emitted electromagnetic signal on said flying vehicle; and
means for evaluating the incoming direction of said vehicle with respect to said airborne moving body,
is remarkable:
in that said emitted electromagnetic signal is a sinusoidal signal cut in pulses, the frequency of which varies linearly as a function of the time according to a predetermined modulation law, in such a way that said reflected electromagnetic signal is also a sinusoidal signal cut in pulses, the frequency of which varies according to the same predetermined modulation law; and
in that said system comprises:
means for forming, from said emitted and reflected electromagnetic signals, an analysis signal the frequency of which corresponds to the frequency deviation between said emitted and reflected signals;

means for carrying out a spectrum analysis of said analysis signal, in such a way as to determine at least one value of said frequency deviation and eliminate the ground echo:
means for calculating, from the determined value of said frequency deviation, the value of at least one evolution parameter for said intercepting vehicle relative to said airborne moving body; and
means for determining, from at least the determined value of said evolution parameter and the incoming direction of said vehicle, an order of avoidance intended for said automatic piloting means, in such a way that said airborne moving body automatically carries out a maneuver for avoiding said vehicle.

Preferably, according to the present method, system and device,
the system comprises four emission and reception antennas; and
said antennas are regularly distributed around one single same transversal section of said airborne moving body.

In an embodiment of the present method, system and device, said moving body comprising at least one altimetry antenna for measuring the height of said moving body above the ground, said system comprises said altimetry antenna and exclusively carries out one of the following actions:
determining an order of avoidance intended for said automatic piloting means, by means of said antennas;
measuring the height of said moving body above the ground by means of said altimetry antenna and of at least some of the means implemented for determining said order of avoidance.

Thus, the avoidance system could alternately carry out threat detection and radio altimetry measurement. Thereby, a mass and volume gain is achieved.

Advantageously, the avoidance system could comprise at least one switch being able to switch the emission and the reception of an electromagnetic signal between at least one of said antennas and said altimetry antenna.

The present method, system and device also relate to an airborne moving body comprising an avoidance system such as previously described.

BRIEF DESCRIPTION OF THE FIGURES

The FIGS. of the appended drawing will better explain how the present method, system and device could be achieved. On these FIGS., identical reference numerals refer to identical elements.

FIG. 3 shows, in a schematic profile, the wave beams of four emission and reception antennas and of one altimetry antenna, mounted on board the airborne moving body, according to the present method, system and device. On FIG. 3, the emission and reception antennas each shows a stationary emission beam.

FIG. 4 shows the emission and reception antennas of FIG. 3 with an electronic scan.

FIG. 5 is a schematic view of the airborne moving body of FIG. 3, taken along line V-V.

FIG. 6 is a schematic view of the airborne moving body of FIG. 4, taken along line VI-VI.

DETAILED DESCRIPTION

Figure 1:
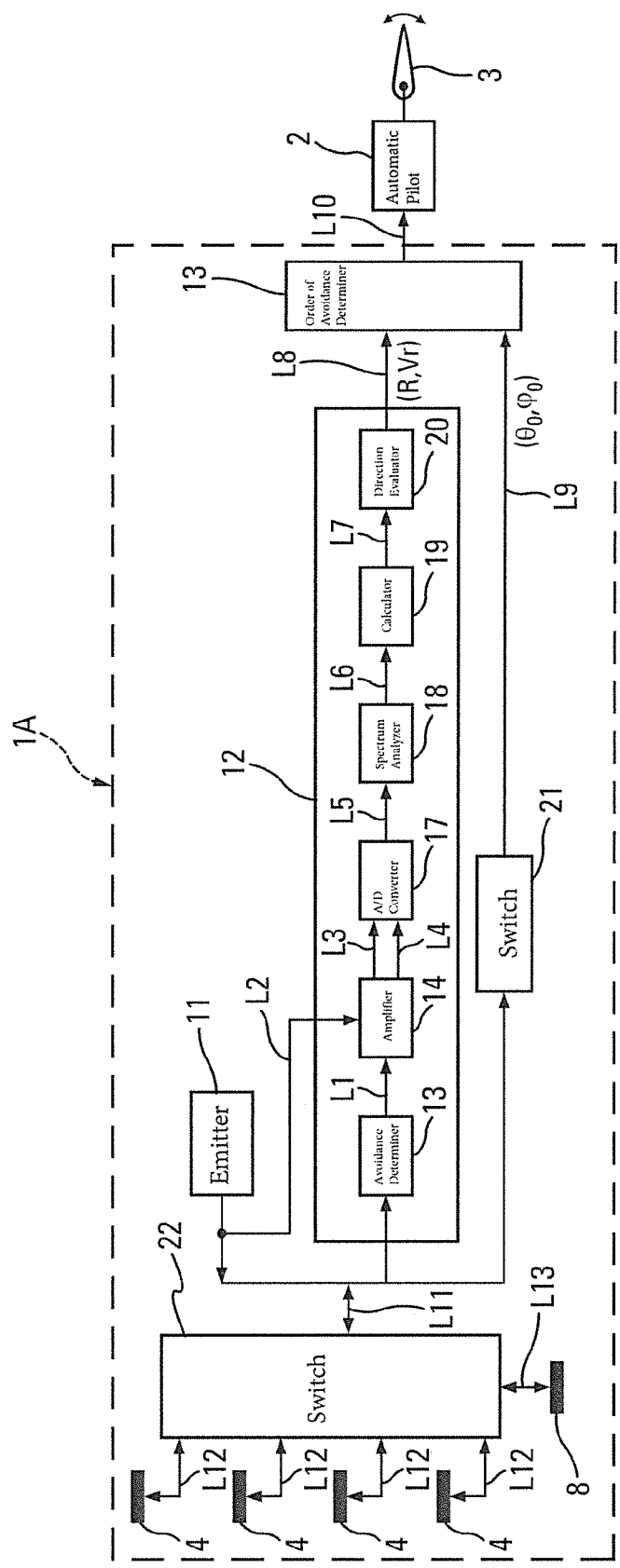
FIGS. 1 and 2 show, in a block diagram, a system for avoiding an intercepting vehicle by an airborne moving body, according respectively to a first and a second embodiment according to the present method, system and device.
Figure 2:
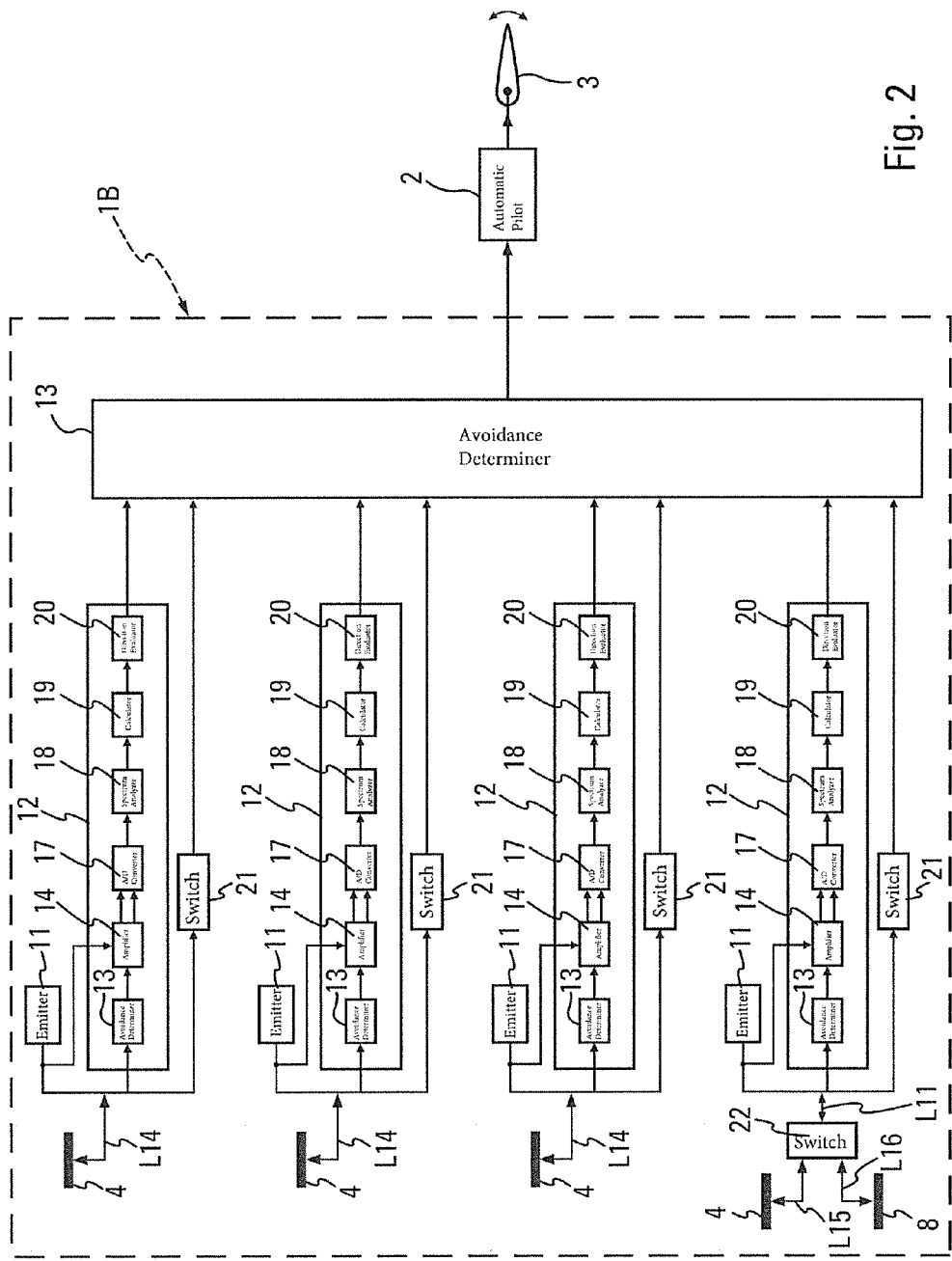

The system 1A, 1B, according to the present method, system and device and shown as a block diagram on FIGS. 1 and 2, is intended for avoiding that an attacking flying vehicle, including of the missile type, intercepts an autonomous moving body M, for example of the missile type. To this end, the avoidance system 1A, 1B generates an order of avoidance being transmitted to automatic piloting means 2 (for instance an actuator controlling a control surface 3) mounted on the moving body M so that the latter carries out a maneuver of avoidance.

As shown on FIGS. 1 to 6, the avoidance system 1A, 1B comprises four emission and reception antennas (subsequently referred to as detection antennas 4) regularly distributed around one single same section of the moving body M. The four antennas 4 are able to emit electromagnetic signals as a beam of electromagnetic waves F, oriented ahead of said moving body M, that could be stationary (FIG. 3) or that could scan a determined angular portion of the space (the antenna is then referred to as with electronic scan) (FIG. 4). They are also able to receive such electromagnetic signals.

Subsequently, for each one of the detection antennas 4, the emission or the reception direction of an electromagnetic signal is usually tracked by the direction of the associated Poynting vector. This is defined by a couple of angles (θ, φ). The angle θ is formed between the direction of the Poynting vector Vp of a signal and the longitudinal axis L-L of the airbone moving body M. The angle φ is as far as it is concerned, defined between the projection Pvp of the Poynting vector Vp on a plane Pt orthogonal to the axis L-L, going through the antenna 4 being considered, and a reference axis Y-Y belonging to the orthogonal plane Pt.

FIGS. 5 and 6 show the emission gain 5 of each one of the antennas 4. In the case of the electronic scan detection antennas 4 (FIG. 6), the concentric rings 6 correspond to the gains 5 of the detection antennas 4 according to different checks of the associated beams, relative to the axis L-L.

Whatever the type of antenna 4, there are areas of overlapping 7 of the emission gains 5. There are 7 overlapping areas.

The avoidance system 1A, 1B further comprises an altimetry antenna 8 dedicated to the measurement of the height of the moving body M above the ground. It emits a beam of electromagnetic waves Fa oriented to the ground (FIGS. 3 and 4).

Hereinunder, the following is to be understood:

"emitted" signal 9: an electromagnetic signal emitted by one of the detection antennas 4; and "reflected" signal 10: an electromagnetic signal emitted by one of the detection antennas 4, that has been reflected by the intercepting vehicle and received by one or more reception antennas 4. It should be noticed that the reflected signal 10 comprises a useful part, corresponding to the signal actually reflected by the vehicle, and an interference part, corresponding to the reflection of the signal emitted on the ground (also referred to as ground echo). The ground echo disturbs the detection of the useful part of the reflected signal 10. In the remainder of the description, the reflected signal 10 therefore comprises a useful part on which the ground echo superimposes.

According to the present method, system and device, the avoidance system 1A, 1B comprises:

at least one emitter 11, for example of the hyperfrequency type, formed for generating an electromagnetic signal 9 intended for being emitted by at least one of the four detection antennas 4;

means 12 for processing the corresponding reflected signal 10 received by at least one detection antenna 4; and means 13 for determining an order of avoidance intended for the automatic piloting means 2 of the moving body M.

Figure 7:
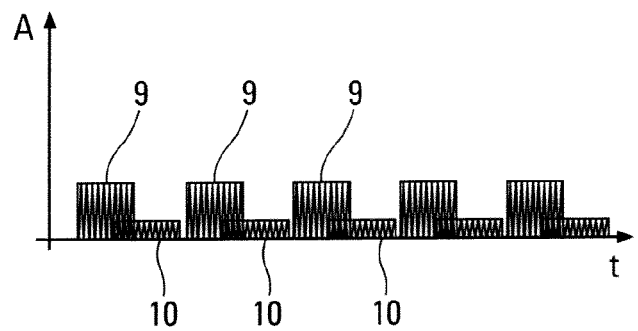
FIG. 7 is a diagram showing the time evolution of a pulse signal emitted by the avoidance system of the present method, system and device accompanied by the pulse signal received as a response, after the signal emitted on an intercepting vehicle has been reflected.

As shown on FIG. 7 (the ordinate axis showing the amplitude A of a signal), it is considered that:

each electromagnetic signal 9 emitted by a detection antenna 4 is a sinusoid being cut in pulses, the frequency Fe of which varies linearly as a function of the time according to a predetermined modulation law. Cutting in pulses allows to alternate periods of emission and periods of silence, during which it is possible to analyze the corresponding reflected signal 10, using means 12, without being disturbed by the emitted signal 9; and the intercepting vehicle has a radial speed Vr relative to the moving body M and is separated from the latter from a distance R.

Figure 9:
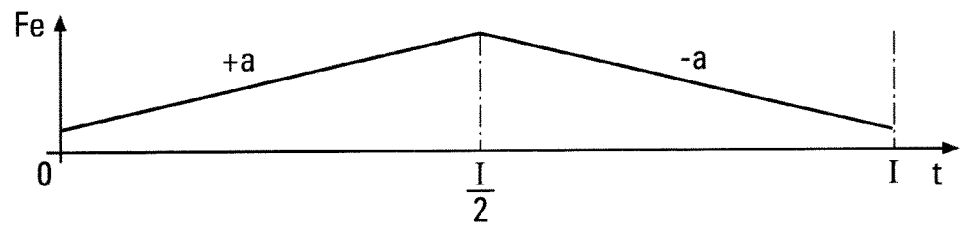
FIG. 9 illustrates the frequency modulation law applied to the pulse signal emitted by the avoidance system, over an emission period.

The frequency modulation law of each emitted signal 9 is, for example, defined as follows (FIG. 9):

the frequency Fe of the emitted signal 9 varies linearly as a function of time according to a modulation slope equal to +a (a being a constant), during a first time interval of emission [0; I/2] (for instance, equal to half the emission period I of the emitted signal 9 being considered); and the frequency Fe varies linearly as a function of time according to the opposite of this modulation slope +a (that is a modulation slope −a), during a second time interval of emission [I/2; I].

Figure 10:
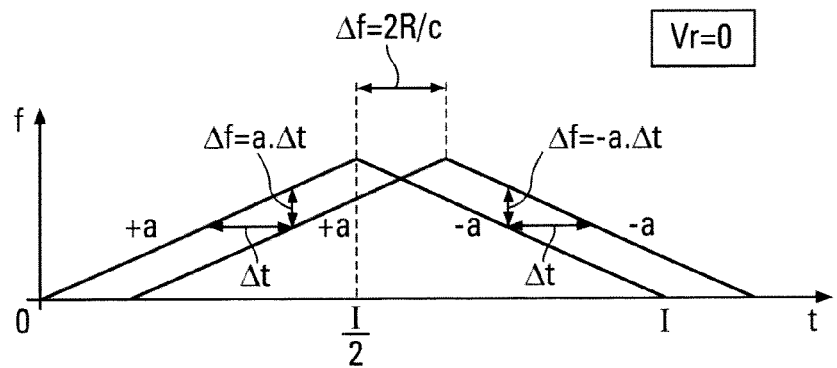
FIG. 10 shows the evolution of the frequency as a function of the time of an emitted signal and of the corresponding reflected signal, when the radial speed of an intercepting vehicle relative to the airborne moving body is nil and the distance separating the vehicle from the moving body is not nil.

On the other hand, the signal 10 as reflected by the intercepting vehicle undergoes the following alterations relative to the corresponding emitted signal 9:

a delay $$\Delta t = \frac{2R}{c},$$

c being the speed of light. Indeed, as shown on FIG. 10 which Vr=0), the reflected signal 10 has a horizontal translation (that is according to the time axis t) relative to the corresponding emitted signal 9, resulting in a first frequency offset $\Delta f=a\Delta t$ on the positive slope +a and $\Delta f=-a\Delta t$ on the negative slope −a; and a second frequency offset $$\Delta f = 2\frac{Vr}{\lambda}$$

Figure 11:
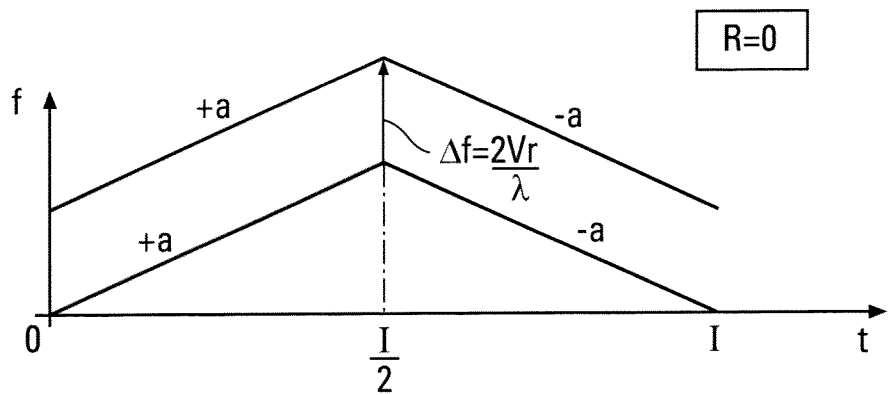
FIG. 11 is similar to FIG. 10, the distance separating an intercepting vehicle from the moving body being nil and the relative radial speed being different from zero.

($\lambda$ being the wavelength of the emitted signal 9) corresponding to a vertical translation (that is according to the axis of frequencies f) of the reflected signal 10 relative to the emitted signal 9 as shown on FIG. 11 (for which R=0).

Figure 12:
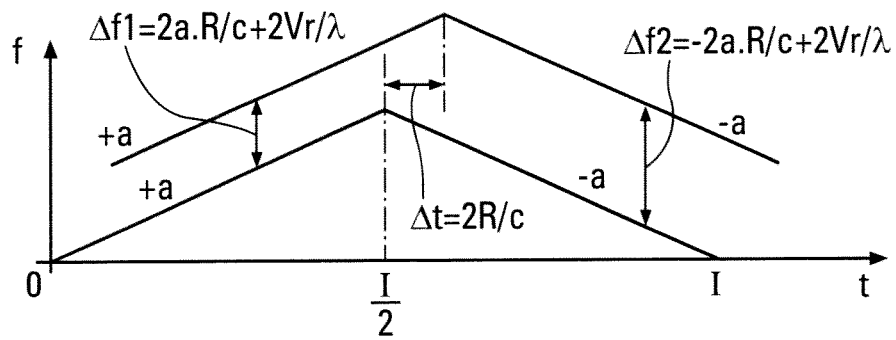
FIG. 12, being similar to FIGS. 10 and 11, shows the time evolution of the frequency of an emitted signal and of the corresponding reflected signal received by the system of the present method, system and device, when the radial speed of an intercepting vehicle relative to the airborne moving body and their separation distance are not nil.
Figure 13:
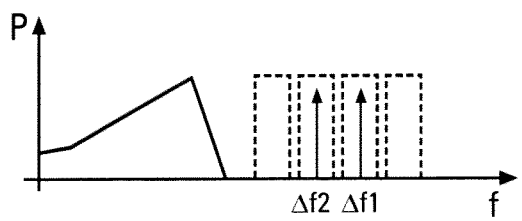
FIG. 13 shows the spectrum analysis, via a Fourier transform, of the reflected signal of FIG. 12, carried out by the avoidance system of the present method, system and device.

Thus, the intercepting vehicle having a distance R and a relative speed Vr relative to the moving body M, both above mentioned alterations are added together on FIG. 12, so that the frequency deviation between the frequency of the emitted signal 9 and that of the reflected signal 10 is equal to:

$$\Delta f1 = \frac{2aR}{c} + \frac{2Vr}{\lambda}$$

on at least one part of the first time interval of emission (for which the frequency modulation has a slope +a); and $$\Delta f2 = -\frac{2aR}{c} + \frac{2Vr}{\lambda}$$

on at least one part of the second time interval of emission for which the frequency modulation has a slope −a).

Figure 8:
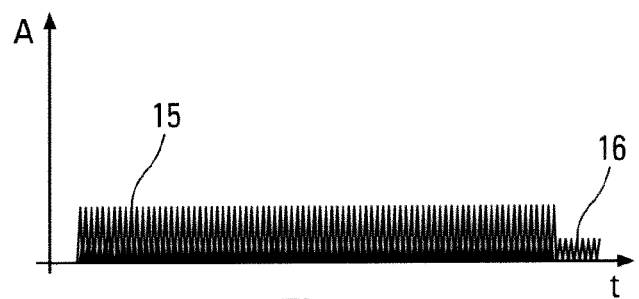
FIG. 8 shows the emitted and reflected pulse signals of FIG. 7, after they have been transformed into continuous signals by the avoidance system of the present method, system and device.

Within the scope of the present method, system and device, as shown on FIGS. 1 and 2, the processing means 12 for a reflected signal 10, received by at least one detection antenna 4, comprise:

means 14 for amplifying the reflected signal 10 being received;

means 15 for converting each one of the emitted 9 and reflected 10 pulse signals into a continuous signal C1, C2 remaining modulated according to the same above mentioned frequency modulation law (FIG. 8). Such means 15 are linked to the amplification means 14 and to the emitter 11, via respectively the links L1 and L2;

an analog mixer 16, of the usual type, receiving from means 15 the continuous emitted signal C1 and the continuous reflected signal C2, via the links L3 and L4. The mixer 16 is able to combine together such signals C1 and C2, so as to deliver, in outlet, an analog analysis signal, the frequency of which corresponds to the frequency deviation between the frequency of the continuous emitted signal C1 and that of the continuous reflected signal C2;

an analog-digital converter 17 converting the analog analysis signal from the mixer 16 (link L5) into a digital analysis signal;

means 18 for carrying out a spectrum analysis, via a fast digital Fourier transform, of the digital analysis signal received from the converter 17, via the link L6. The spectrum analysis of the analysis signal allows to isolate the useful part of the reflected signal and to eliminate the ground echo, including when the intercepting vehicle has a speed relative to the ground sufficiently high and that it is moving toward the moving body M. In addition, such a spectrum analysis further allows the determination of the spectrum lines corresponding to $\Delta f1$ and to $\Delta f2$. The spectrum analysis therefore has two functions:

separating the spectrum lines $\Delta f1$ and $\Delta f2$ from the ground echo; and estimating the frequencies $\Delta f1$ and $\Delta f2$. The estimation of the frequency $\Delta f1$ (respectively $\Delta f2$) corresponds to the number of a Doppler filter, for which the spectrum line $\Delta f1$ (respectively $\Delta f2$); and means 19 for calculating the distance R and the radial speed Vr of the intercepting vehicle relative to the moving body M. Such calculation means 19 are linked to the means 18 via the link L7, and are able to receive the value of spectrum lines corresponding to $\Delta f1$ and to $\Delta f2$.

From the following relationships:

$$R = \frac{c}{4a}(\Delta f1 - \Delta f2); \text{ and}$$

$$Vr = \frac{\lambda}{4}(\Delta f1 + \Delta f2),$$

the calculation means 19 are able to deliver, in outlet, the value of the distance R and of the speed Vr.

In addition, the avoidance system 1A, 1B of the present method, system and device also comprises means 20 for evaluating the incoming direction of the intercepting vehicle relative to said moving body M while estimating the direction of the Poynting vector Vp associated with the reflected signal 10 (corresponding to the determination of the couple of angles ($\theta$o, $\phi$o) of FIGS. 4 and 6).

Thus, the estimation of the angle $\theta$o, that could only be contemplated for electronic scan detection antennas 4, is achieved, usually, through comparing two gain values A1 and A2 obtained through two adjacent checks of the beam of waves F of one single same detection antenna 4 (FIG. 4).

Similarly, the angle $\phi$o of the incoming direction is estimated through comparing two gain values A3 and A4 obtained respectively from two detection antennas 4 having their beams of waves F adjacent (FIG. 6). As opposed to the estimation of $\theta$o, the angle $\phi$o could be determined whatever the type of detection antenna 4 (with a stationary beam or with an electronic scan).

Moreover, within the scope of the present method, system and device, the avoidance system 1A, 1B comprises means 13 for establishing an order of avoidance from values of R, Vr, $\theta$o and $\phi$o received from the calculation means 19 and from the determination means 20 for the incoming direction of the intercepting vehicle, via the links L8 and L9. The means 13 are able to deliver, in outlet (link L10), an order of avoidance provided for the automatic piloting means 2 of the moving body M. As soon as such an order of avoidance is received, the automatic piloting means 2 can automatically implement the corresponding avoidance maneuver in order to prevent the mobile M from being destroyed by the intercepting vehicle.

It is considered hereinafter that the emitter 11, the processing means 12 and the determination means 20 for an incoming direction form an emission-reception string of the avoidance system 1A, 1B.

In a first embodiment of the present method, system and device, shown on FIG. 1, the avoidance system 1A comprises a single emission-reception string being shared, by means of a switch 21, between the four detection antennas 4 and the altimetry antenna 8. The switch 21 comprises an inlet (the emission-reception string), formed by the link L11, and five outlets (the four detection antennas 4 and the altimetry antenna 8) formed by the links L12 and L13.

The switch 21 allows, on the single emission-reception string, either the four antennas 4 alternately, or the antenna 8 to be switched.

In a second embodiment of the present method, system and device, shown on FIG. 2, the avoidance system 1B comprises three emission-reception strings being linked, respectively, to three detection antennas 4 (link L14), and one emission-reception string, being shared between the fourth detection antenna 4 and the altimetry antenna 8 by means of a switch 21. The latter comprises an inlet (the shared emission-reception string) formed by the link L11 and two outlets (the fourth antenna 4 and the altimetry antenna 8) formed by the links L15 and L16.

In this second mode, the unshared strings supply directly the three associated detection antennas 4.

Within the scope of the present method, system and device, whatever the embodiment, the avoidance system 1A, 1B has, in addition to its avoidance function, a radio altimetry function (that is it is able to determine the height of the moving body M relative to the ground by means of the altimetry antenna 8). The threat detection function and the radio altimetry function exclude one another, in such a way that the system 1A, 1B operates either in a threat detecting mode, or in a radioaltimeter mode.

Thus, carrying out radio altimetry measurements implements a shared emission-reception string, as previously described.

The invention claimed is:

1. A method for avoiding a flying intercepting vehicle by an airborne moving body, said airborne moving body comprising automatic piloting means as well as emitting and receiving antennas for electromagnetic signals,
wherein the following steps are automatically carried out:
by means of at least one of said antennas, at least one electromagnetic signal is emitted ahead of the airborne moving body, a frequency of which is temporally modulated;
by at least one of said antennas, at least one reflected electromagnetic signal is received, corresponding to the reflection of said electromagnetic signal emitted on said intercepting vehicle; and
an incoming direction ($\theta$o, $\phi$o) of said vehicle is evaluated relative to said airborne moving body,
wherein:
said emitted electromagnetic signal is a sinusoidal signal being cut in pulses, the frequency of which varies linearly as a function of time according to a predetermined modulation law, in such a way that said reflected electromagnetic signal is also a sinusoidal signal being cut in pulses, the frequency of which varies according to the same predetermined modulation law; and
the following steps are further automatically carried out:
from said emitted and reflected electromagnetic signals, at least one analysis signal is formed, the frequency of which corresponds to the deviation of frequencies ($\Delta$f1, $\Delta$f2) between the frequencies of said emitted and reflected signals;
a spectrum analysis of said analysis signal is carried out for determining at least one value of said deviation of frequencies ($\Delta$f1, $\Delta$f2) and for eliminating ground echo;
from said determined value of said deviation of determined frequencies ($\Delta$f1, $\Delta$f2), the value is calculated of at least one evolution parameter (R, Vr) for said intercepting vehicle relative to said airborne moving body; and
from at least the determined value of said evolution parameter (R, Vr) and the incoming direction ($\theta$o, $\phi$o) of said vehicle, an order of avoidance is determined provided for said automatic piloting means, in such a way that said airborne moving body automatically carries out an avoidance maneuver for said vehicle.

2. The method according to claim 1, wherein preliminarily to forming said analysis signal, each of said emitted and reflected signals is converted into a continuous sinusoidal signal (C1, C2), the frequency of which linearly varies as a function of time according to said modulation law.

3. The method according to claim 2, wherein:
according to said predetermined modulation law, the frequency varies as a function of time according to a predefined modulation slope (+a), during a first time interval of emission, and according to the opposite of said modulation slope (−a), during a second time interval of emission; and
wherein said frequency deviation ($\Delta$f1, $\Delta$f2) between the frequencies of said emitted and reflected signals varies in the course of time and is defined by the following relationships:

$$\Delta f1 = \frac{2aR}{c} + \frac{2Vr}{\lambda}$$

on at least one part of said first time interval; and $$\Delta f2 = -\frac{2aR}{c} + \frac{2Vr}{\lambda}$$

on at least one part of said second time interval;
wherein:
a represents said modulation slope;
R corresponds to the distance separating said airborne moving body from said vehicle;
c is equal to the speed of light;
Vr represents the relative radial speed of said vehicle relative to said moving body; and
$\lambda$ corresponds to the wavelength of said emitted signal.

4. The method according to claim 1, wherein said spectrum analysis is a fast digital Fourier transform analysis.

5. The method according to claim 1, wherein for evaluating the incoming direction ($\theta$o, $\phi$o) of said vehicle relative to said airborne moving body, the direction of the Poynting vector (Vp) associated with said reflected signal is determined by estimating a first angle ($\theta$o), defined between the direction of said Poynting vector (Vp) and the longitudinal axis (L-L) of said airborne moving body, and a second angle ($\phi$o), defined between the projection ($Pv_p$) of said Poynting vector (Vp) on a plane (Pt) orthogonal to the longitudinal axis (L-L) of said airborne moving body, crossing one of said antennas, and a reference axis (Y-Y) belonging to said orthogonal plane (Pt).

6. The method according to claim 1, wherein:
said airborne moving body comprises four emission and reception antennas; and
said antennas are regularly distributed around one single same transversal section of said airborne moving body.

7. The method according to claim 1, said airborne moving body being provided with at least one altimetry antenna for measuring the height of said airborne moving body above the ground, wherein one of the following steps is exclusively carried out:
an order of avoidance is determined being provided for said automatic piloting means;
the height of said airborne moving body is measured above the ground, by means of said altimetry antenna.

8. The method according to claim 1, wherein the emission and reception antennas have areas of overlapping gains.

9. A system for avoiding a flying intercepting vehicle by an airborne moving body, said airborne moving body comprising automatic piloting means and emission and reception antennas for electromagnetic signals, said system, embedded on board said airborne moving body, comprising:
said antennas able to emit, ahead of said moving body, an electromagnetic signal a frequency of which is temporally modulated and to receive a reflected electromagnetic signal corresponding to the reflection of said emitted electromagnetic signal on said flying vehicle; and
means for evaluating an incoming direction ($\theta o$, $\phi o$) of said vehicle relative to said airborne moving body;
wherein
said emitted electromagnetic signal is a sinusoidal signal being cut in pulses, the frequency of which varies linearly as a function of time according to a predetermined modulation law, in such a way that said reflected electromagnetic signal is also a sinusoidal signal being cut in pulses, the frequency of which varies according to the same predetermined modulation law; and
said system comprises:
means for forming, from said emitted and reflected electromagnetic signals, an analysis signal the frequency of which corresponds to the frequency deviation ($\Delta f1$, $\Delta f2$) between the frequencies of said emitted and reflected signals;
means for carrying out a spectrum analysis of said analysis signal, in such a way as to determine at least one value of said frequency deviation ($\Delta f1$, $\Delta f2$) and to eliminate ground echo;
means for calculating, from the determined value of said frequency deviation, the value of at least one evolution parameter (R, Vr) of said intercepting vehicle relative to said airborne moving body; and
means for determining, from at least the determined value of said evolution parameter (R, Vr) and the incoming direction ($\theta o$, $\phi o$) of said vehicle, an order of avoidance intended for said automatic piloting means, in such a way that said airborne moving body automatically carries out an avoiding maneuver for said vehicle.

10. The system according to claim 9, further comprising:
four emission and reception antennas; wherein said antennas are regularly distributed around one single same transversal section of said airborne moving body.

11. The system according to claim 9, said airborne moving body comprising at least one altimetry antenna for measuring the height of said airborne moving body above the ground;
wherein
said system comprises said altimetry antenna; and
said system exclusively carries out one of the following actions:
determining an order of avoidance intended for said automatic piloting means, by means of said antennas;
measuring the height of said airborne moving body above the ground, by means of said altimetry antenna and of at least some of the means implemented for determining said order of avoidance.

12. The system according to claim 11, further comprising at least one switch being able to switch the emission and the reception of an electromagnetic signal between at least one of said antennas and said altimetry antenna.

13. The system according to claim 9, wherein the emission and reception antennas have areas of overlapping gains.

14. An airborne moving body comprising an avoidance system such as specified in claim 9.

15. The body according to claim 14, further comprising:
four emission and reception antennas; wherein said antennas are regularly distributed around one single same transversal section of said airborne moving body.

16. The body according to claim 14, wherein preliminarily to forming said analysis signal, each of said emitted and reflected signals is converted into a continuous sinusoidal signal (C1, C2), the frequency of which linearly varies as a function of time according to said modulation law.

17. The body according to claim 14, wherein said spectrum analysis is a fast digital Fourier transform analysis.

18. The body according to claim 14, said airborne moving body being provided with at least one altimetry antenna for measuring the height of said airborne moving body above the ground,
wherein one of the following steps is exclusively carried out:
an order of avoidance is determined being provided for said automatic piloting means;
the height of said airborne moving body is measured above the ground, by means of said altimetry antenna.

19. The body according to claim 18, further comprising at least one switch being able to switch the emission and the reception of an electromagnetic signal between at least one of said antennas and said altimetry antenna.

20. The body according to claim 14, wherein the body is capable of orbital travel.

* * * * *